United States Patent Office 2,802,738
Patented Aug. 13, 1957

2,802,738

PROTEIN FOOD PRODUCT AND PROCESS FOR THE PREPARATION OF THE SAME

Mortimer Louis Anson, New York, N. Y., and Morton Pader, West Englewood, N. J., assignors to Lever Brothers Company, New York, N. Y., a corporation of Maine No Drawing. Application May 14, 1954,
Serial No. 429,984

15 Claims. (Cl. 99—14)

The present invention relates to an edible protein food product of smooth, soft texture and high nutritive value which is particularly useful in special types of diets in lieu of meat, and to a process for the preparation thereof.

A protein food product in order to be suitable for feeding in lieu of meat to babies, invalids and other persons requiring special diet must meet certain requirements. Specifically, it must have a smooth, soft texture; it must have a high protein nutritive value, preferably at least comparable to that of meat; and it must have little or no off-flavor so that it can be palatably flavored by the addition of minor amounts of flavoring additives. The product must also have these qualities after heat treatment. The obtention of all of these requirements in one product is a problem of unusual difficulty. For example, many proteins isolated from common sources are too highly flavored and, when a suspension of unmodified protein of the proper concentration and pH is autoclaved, the suspension becomes too firm for use as a soft food such as baby food. The undesirable flavor and texture can sometimes be compensated for by lowering the concentration of protein in the product but this results in a product of low nutritive value.

We have discovered that vegetable proteins, preferably those of oilseed origin, such as soy protein, can be made into a protein food product which meets all of the above requirements by a process which involves, in part, partial digestion by a proteolytic enzyme of a relatively highly concentrated aqueous suspension of protein. Enzyme digestion of proteins is known and, while it was to be expected that a heated protein suspension would be less firm if the protein were first partially digested by an enzyme, it was not predictable that it would be possible to achieve a texture simulating, e. g., strained meat or that such texture could be obtained in a controlled and reproducible way or that the extent of digestion required would not result in the development of off-flavor. However, by only partially digesting the protein within certain fairly critical limits, we are enabled to produce a product of the desired texture practically free from off-flavor.

In accordance with the process of the invention, an aqueous suspension of vegetable protein is subjected to hydrolysis by a proteolytic enzyme until about 10 to 40%, preferably 20 to 30%, of the protein is digested as measured by the percent of nitrogen that is converted to a form soluble in water at the isoelectric point of the protein. Flavoring, coloring and nutritive additives can then be added and the product canned.

The final product is a mushy, smooth paste of determinant protein content varying in texture from a flowable semisolid to a cheese consistency. Without any flavoring additives, it is substantially free from off-flavor. Its protein nutritive value approximates meat or is even higher and it is capable of withstanding relatively high temperatures without development of off-flavor and without objectionable change in texture.

Having outlined the process generally, the various steps of the process will now be described in greater detail.

It is first necessary to prepare or obtain on the market a suitably concentrated aqueous suspension of vegetable protein whose nutritive value has not been damaged during isolation. As previously stated, we prefer to employ an oilseed protein and have obtained particularly good products with soy protein. There are several known and conventional methods for the isolation of protein from vegetable sources and any of these methods that do not harm the nutritive value or flavor of the resultant coagulated protein can be employed. We have found suitable, for example, water extraction, extraction with dilute calcium chloride solution and extraction with aqueous sodium hydroxide.

In the case of soy protein, however, a preferred extraction procedure devised by us comprises suspending flakes of soy bean meal in an aqueous solution of calcium hydroxide of about 0.003 molarity. Steam is then sparged into the suspension of flakes, with agitation, until the temperature of the suspension is about 60° C. The suspension is then pumped through a centrifuge to obtain a clarified extract, which, in the usual instance, has a pH of about 6.8 to 6.9. The protein in the extract is then coagulated by the addition of an acid, such as hydrochloric acid, to bring the pH to about 5 and subsequent centrifugation then yields a solid aqueous suspension of coagulated protein. Preferably, the coagulated protein is then resuspended in water for purposes of washing, and centrifuged again. The washed, coagulated protein can then be dried preparatory to preparing the protein food product therefrom or it can be stored in the wet state. If the coagulated protein is to be kept for a long time, it is preferred to tray dry or spray dry the material for purposes of storage although the wet cake of coagulated protein can be stored at low temperatures for reasonable lengths of time.

For the purposes of the present invention, it has been found that protein coagulated at a relatively high temperature, for example, from about 80° C. up to about 100° C., has less off-flavor, and provides a product of better texture and lighter color, and the final texture of the product is less sensitive to variations in the conditions and time of enzyme digestion. Furthermore, heat coagulation is desirable from the bacteriological standpoint. However, protein coagulated at temperatures as low as room temperature can also be used.

For the purposes of the present invention, it is preferred that the final product contain at least about 15% protein, including digestion products, by weight up to about 25% by weight in order to have approximately the same protein nutritive value as meat, or better. In order to obtain a product of this protein content, the suspension of protein should have a slightly higher protein content since the subsequent addition of additives results in a lowering of the protein content, and, therefore, we prefer to subject to enzyme digestion a suspension of coagulated protein having a coagulated protein content somewhat higher than 15%. The suspension at the time of digestion may also contain any additives which are to be included in the product. The adjustment of protein content can be carried out by the addition of water to the suspension prior to enzyme digestion.

In the enzyme digestion of the suspension there can be used any of several known proteolytic enzymes, from animal, plant, fungal, or microbial sources, such as papain and trypsin. In carrying out the digestion the pH and temperature of the protein suspension are usually adjusted to those for maximum activity of the particular enzyme used. For example, with papain the protein suspension is adjusted to pH 7 and heated to about 60–70° C. Usually less than 1% of enzyme, based on dry protein weight, is added. It should be understood, however, that digestion conditions can be used other than those at which the particular enzyme exhibits maximum activity, that more than 1% of enzyme may be used, depending on the properties of the enzyme preparation and on economic and manufacturing considerations, and that enzyme activators or inhibitors may be used as desired. The suspension is then held at the desired temperature with continuous agitation until the desired amount of hydrolysis has occurred, i. e., from about 10 to 40%, preferably 20 to 30%, as measured by the amount of nitrogen of the protein that is converted to a form soluble at the isoelectric point of the protein, or by a measurement correlated with this value. The enzyme action can then be stopped, e. g., by strong heating before proceeding to subsequent operations.

Following the digestion of the protein, an edible acid, such as hydrochloric acid, can be added, if necessary, to lower the pH of the digested suspension since the pH of the protein food product is important in determining its texture. The pH for soy protein, for example, can be from about 6 to 7, with the optimum pH about 6.5 to 6.7. If the pH is lower than 6, the product is gritty and too fluid. If the pH is appreciably higher than 7, the product is too viscous.

At this stage, the protein in the product is partly undigested protein and partly protein digestion products. The enzyme digestion products, which are soluble, supply as much protein nutriment as does the coagulated protein from which they are formed. The undigested protein, which we term "structural protein," gives body to the product which would be lacking if the enzyme digestion were complete. Although we have described the insoluble "structural protein" remaining after the enzyme digestion as undigested protein, it is possible that its desirable characteristics are the result at least in part of enzymatic attack but the invention is not to be limited by theory.

The amount of digestion is critical from the standpoint of both texture and flavor. When the extent of digestion is inadequate, the product is too firm and not smooth enough for consumption by, for instance, babies. With excessive digestion, the product is too fluid and has an off-flavor caused by an excess of enzyme digested protein.

Following the adjustment of pH, if such has been necessary, various additives are added to the enzyme digested suspension of protein by admixture therewith. In order to simulate more closely the nutritive value of meat, we prefer to add a minor amount of fat, usually from about 2 to 20% by weight of the final product, and also find it desirable to add flavoring and coloring additives in the amounts customarily used in food products. Furthermore, vitamins, minerals and like nutritional adjuncts can be added, if desired, to enrich the nutritional value of the final product.

Finally, the product is milled in order to provide uniformity and optimum smoothness, and then canned in conventional manner.

In order to further illustrate the invention, the following example, in which percentages are by weight, is presented.

Example

Twenty-five (25) kilograms of soy bean flakes are dispersed in 490 liters of a 0.003 molar solution of calcium hydroxide made with filtered tap water. Purified steam was then sparged into the stirred suspension until a temperature of 60° C. was reached, this requiring about 12 minutes. The condensed steam raised the volume of water to 500 liters. The 60° C. suspension was then pumped through a solid basket centrifuge and the resultant 428 liters of clarified extract were pumped to a second tank, the total clarification time being about 1 hour. The residue was rejected.

The pH of the suspension after extraction was 7 to 7.1 and the pH of the clarified extract was 6.8 to 6.9.

The extract was heated to about 100° C. and about 6.8 ml. of 3 normal hydrochloric acid per liter of clarified extract was next added to bring the pH to 5±0.1 thereby causing coagulation of the protein and the resultant suspension was then pumped through a centrifuge and a paste of coagulated protein was obtained. The protein was then suspended in a small volume in water and passed through a colloid mill, diluted with additional water to 455 liters and heated to 100° C. with live steam while being stirred vigorously. The washed coagulated protein was then centrifuged to obtain an aqueous cake of coagulated protein containing about 31% solids having a pH of 5.

The washed cake of protein was suspended in sufficient water to lower the protein content to 16% and the pH adjusted to 7 by the addition of sodium hydroxide. The resulting suspension was next heated to 60 to 70° C. and 0.3% papain, calculated on the dry weight of protein, was added and thoroughly mixed in. The suspension was then held at 60 to 70° C. for 30 minutes while stirring continuously and thereafter hydrochloric acid was added until the pH of the suspension was about 6.5. At this point the protein had been digested to the extent that about 22% of the nitrogen in the protein had been converted to a form soluble at the isoelectric point of the protein. Next, about 5% by weight of the suspension of hydrogenated vegetable fat was added (lowering the protein concentration to about 15%) and flavoring, coloring and nutritional materials were also added. The final product was then milled and canned in 3½ ounce cans. It was a mushy, rather smooth paste which, due to the flavoring additives, had a flavor similar to that of canned strained meat. The nutritive value of the protein in the product was as high as the starting protein as measured by rat growth tests.

Other products were similarly prepared varying the extent of enzyme digestion and it was found that products of optimum flavor and texture were obtained when the digestion was from 20 to 30% while suitable products were prepared within the ranges of 10 to 40% digestion. When the digestion was allowed to proceed beyond 40%, the product not only became too fluid but developed an excessive off-flavor. On the other hand, products in which the digestion was less than 15% had unsatisfactory texture even after milling.

It is obvious that many modifications may be made in the invention by a person skilled in the art without departing from the spirit of the invention. Accordingly, the application is to be limited only by the scope of the appended claims.

We claim:

1. A protein food product of smooth, soft texture and substantially free from off flavor which simulates strained baby food meat comprising a heat-treated aqueous suspension of unstretched, unoriented, coagulated vegetable protein and proteolytic enzyme digestion products thereof, about 10 to 40% by weight of the total nitrogen of the protein and its digestion products being in a form soluble in water at the isoelectric point of the protein.

2. A protein food product according to claim 1 in which the combined protein and digestion products comprise at least 15% by weight of the aqueous suspension.

3. A protein food product according to claim 2 in which the protein is oilseed protein.

4. A protein food product according to claim 3 in which the protein is soy protein.

5. A protein food product according to claim 1 in which the aqueous suspension is blended with flavoring and coloring additives and fat.

6. A protein food product according to claim 5 in which the protein is an oilseed protein.

7. A protein food product according to claim 5 in which the protein is soy protein.

8. A protein food product according to claim 7 in which the protein and digestion products comprise at least about 15% by weight of the aqueous suspension.

9. A process for the preparation of a protein food product of smooth, soft texture and substantially free from off flavor simulating strained baby food meat which comprises digesting an aqueous suspension of unoriented, unstretched, coagulated vegetable protein with a proteolytic enzyme until about 10 to 40% by weight of the protein nitrogen is in a form soluble in water at the isoelectric point and heating said suspension.

10. A process according to claim 9 in which the aqueous suspension contains at least about 15% by weight of protein.

11. A process according to claim 10 in which the protein is an oilseed protein.

12. A process according to claim 11 in which the protein is soy protein.

13. A process according to claim 10 in which the suspension is blended with fat and with flavoring and coloring additives.

14. A process according to claim 13 in which the protein is an oilseed protein.

15. A process according to claim 14 in which the protein is soy protein.

References Cited in the file of this patent

UNITED STATES PATENTS

| | | |
|---|---|---|
| 869,371 | Kellogg | Oct. 29, 1907 |
| 2,376,485 | Hermann et al. | May 22, 1945 |
| 2,560,621 | Wrenshall | July 17, 1951 |
| 2,682,466 | Boyer | June 29, 1954 |

FOREIGN PATENTS

| | | |
|---|---|---|
| 699,692 | Great Britain | Nov. 11, 1953 |